(12) United States Patent
Volk et al.

(10) Patent No.: US 6,516,396 B1
(45) Date of Patent: Feb. 4, 2003

(54) MEANS TO EXTEND $T_{TR}$ RANGE OF RDRAMS VIA THE RDRAM MEMORY CONTROLLER

(75) Inventors: Andrew M. Volk, Granite Bay, CA (US); Puthiya K. Nizar, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,300

(22) Filed: Dec. 22, 1999

(51) Int. Cl.[7] ............................................. G06F 12/00
(52) U.S. Cl. ...................................... 711/167; 711/150
(58) Field of Search ................................ 711/117, 150, 711/170, 167; 713/400, 503, 600; 710/2; 709/105

(56) References Cited

U.S. PATENT DOCUMENTS 4,403,286 A * 9/1983 Fry et al. .................... 709/105
5,613,141 A * 3/1997 Szatkowski et al. ............ 710/2
5,664,145 A * 9/1997 Apperley et al. ............ 711/117
6,128,749 A * 10/2000 McDonnell et al. ......... 713/600
6,154,821 A * 11/2000 Barth et al. .................. 711/170
6,226,754 B1 * 5/2001 Ware et al. .................. 713/400
6,226,757 B1 * 5/2001 Ware et al. .................. 713/503

* cited by examiner

*Primary Examiner*—David Hudspeth
*Assistant Examiner*—Fred F. Tzeng
(74) *Attorney, Agent, or Firm*—Blakely, Sokoloff, Taylor & Zafman LLP (57) ABSTRACT

A method and system for extending $t_{TR}$ range of memory devices coupled to a memory devices is described. A first group of memory devices and a second group of memory devices are identified. The first group includes memory devices located close to a memory controller and the second group includes memory devices located a distance away from the memory controller. Commands to access memory devices in the first and second groups are sent. A command to the first group is sent with a transitional delay when the command to the first group follows a command to the second group. In response to the commands, data from the first and second groups is received.

36 Claims, 6 Drawing Sheets

MEANS TO EXTEND $T_{TR}$ RANGE OF RDRAMS VIA THE RDRAM MEMORY CONTROLLER

FIELD OF THE INVENTION

The present invention relates to dynamic random access memory, and more specifically, to memory systems with multiple dynamic random access memory modules.

BACKGROUND

Dynamic random access memory (DRAM) is a general-purpose high-performance memory device suitable for use in a broad range of applications.

Figure 1:
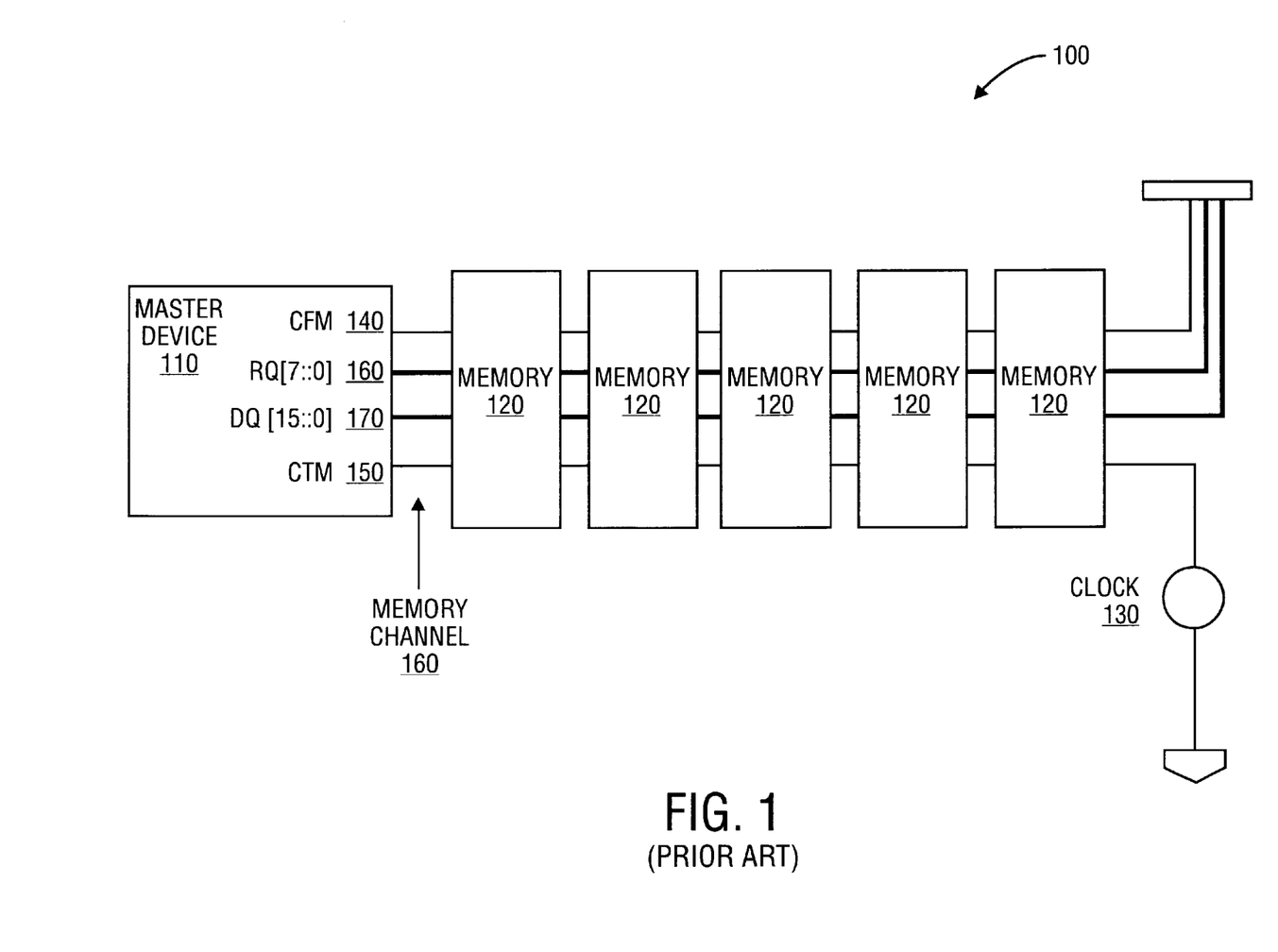
FIG. 1 illustrates a prior art memory system.

FIG. 1 illustrates a prior art memory system. A memory channel 160 is coupled to a master device 110. Master 110 sends requests (commands) 160 to memories 120 and sends and receives data 170 from memories 120. The memories 120 receive the clock-from-master (CFM) 140 and clock-to-master (CTM) 150 signals generated by clock 130. CFM 140 is used to send commands 160 and write data 170 to the memories 120. CTM is used to receive data 170 from the memories 120.

The CFM 140 and CTM 150 signal lines may either be coupled together inside the master 110 or just outside the master 110, having a single clock signal connected into the master 110. At the master device 110, CTM 150 and CFM 140 have the same phase and are not delayed with respect to each other. However, for memories located some distance away from the master, the phase difference between CFM 140 and CTM 150 may be significant. The channel 160 may be long enough to allow the delay between CTM 150 and CFM 140 to be several clock periods apart. A segment of the channel 160 that is characterized by a half clock cycle of data flight time delay represents a timing domain. In addition, a timing domain may be defined as a segment of the channel 160 in which the phase difference between CTM 150 and CFM 140 is equal to a full clock cycle. The second definition applies to reading data from memories 120. When a read command is performed, there is a round-trip delay between sending the command and receiving read data at master 110. As a result, the half clock cycle of data flight time is doubled and becomes a full clock cycle of delay.

Current memory systems, such as the memory system 100, typically do not support the length of channel 160 that exceeds four timing domains. The limited range of timing domains (also known as $t_{TR}$) limits the number of memory devices 120 that can be supported by the channel 160. In one prior art system, memory system 100 may provide for up to 32 memory devices 120 on the channel 160. A number of slots may be provided on channel 160 to receive memory devices 120, such as Rambus Inline Memory Modules (RIMMs™) which can support up to eight memory devices on each side of the module. If the physical length of the channel 160 is limited to four timing domains, it may be insufficient for 32 memory devices on more than two memory modules. In addition, some computer systems, such as systems that support large databases, have a need for large memory subsystems made possible by 64 bit computer architectures. In these computer systems being able to support more than 32 memory devices is advantageous.

SUMMARY OF THE INVENTION

A method for extending $t_{TR}$ range of memory devices is provided in which a first group of memory devices and a second group of memory devices are identified. The first group includes memory devices located close to a memory controller and the second group includes memory devices located a distance away from the memory controller. Commands to access memory devices in the first and second groups are sent. A command to the first group is sent with a transitional delay when the command to the first group follows a command to the second group. Data from the first and second groups is received.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system for extending a $t_{TR}$ range of memory devices coupled to a memory channel are described. A limited $t_{TR}$ range constrains the length of the memory channel, thereby limiting the number of memory devices that may be attached to the memory channel. Adding further timing domain(s) adds extra delay to a data path in each memory device and, as a result, data returned from memory devices in the added timing domain(s) may not be interleaved with data returned from other memory devices. A memory controller solves this problem by levelizing between the data return timing of memory devices in the added timing domain and the data return timing of memory devices in the existing timing domains.

Figure 2:
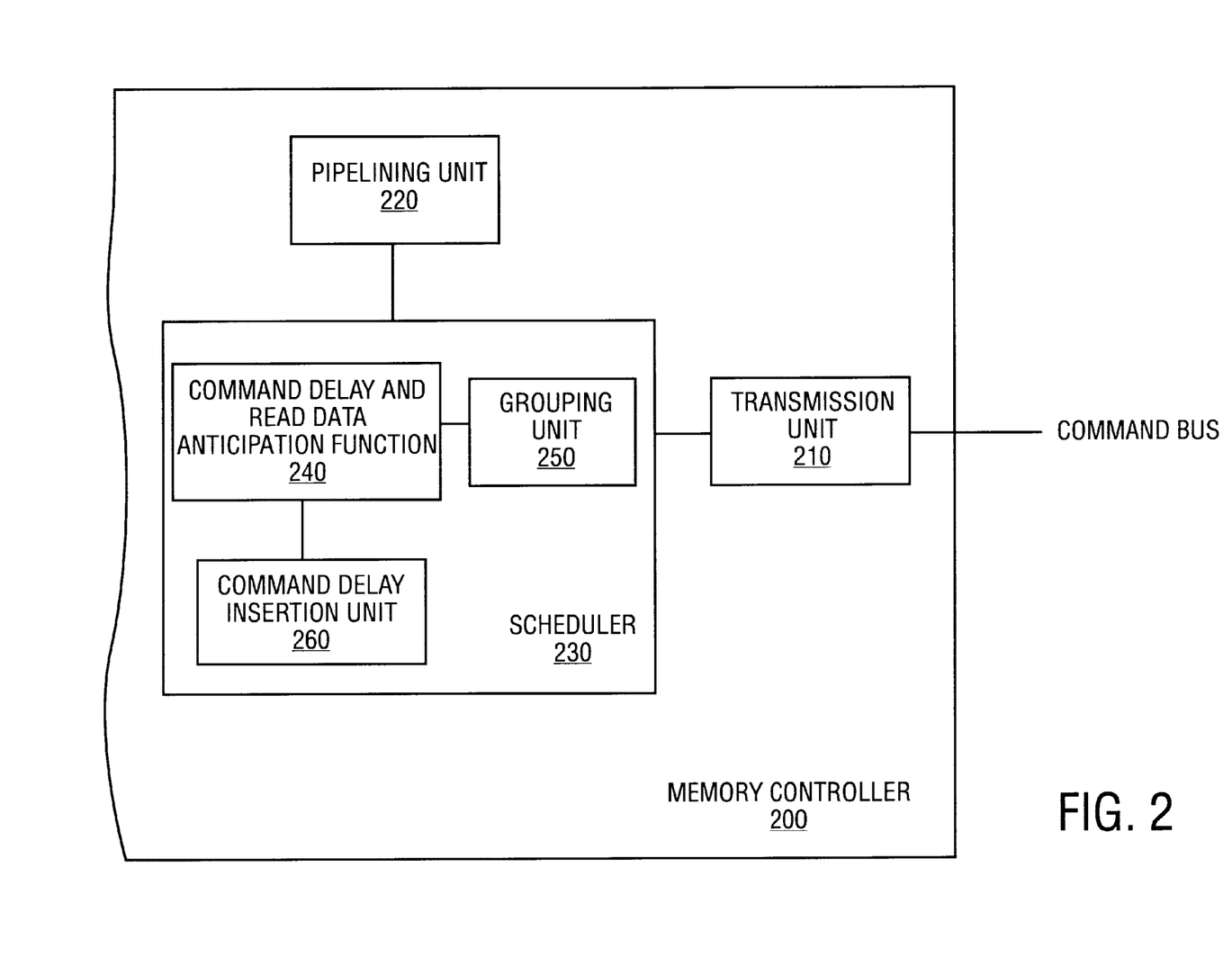
FIG. 2 is a block diagram of one embodiment of the memory controller.

FIG. 2 is a block diagram of one embodiment of a portion of a memory controller that may be used with the present system. Memory controller 200 includes pipelining unit 220 for pipelining instructions. Pipelining instructions are known in the art. Memory controller 200 passes these pipelined instructions to the memory.

Memory controller 200 includes scheduler 230 which monitors the pipelined instructions and determines when to send commands to memory devices. Existing memory devices can support up to four timing domains. Scheduler 230 is designed to levelize the memory channel having more than 4 timing domains. Scheduler 230 includes command delay and read data anticipation function 240 coupled to grouping unit 250 and command delay insertion unit 260.

Grouping unit 250 combines memories in various timing domains into two or more groups. In one embodiment, grouping unit 250 is programmed to determine which memories fall into which group. Command delay and read data anticipation function 240 levelizes between the groups. In one embodiment, when read commands to memories in a first group follow read commands to a second group, function 240 delays the commands to the first group. The delay is performed by command delay insertion unit 260 which inserts one or more cycles of bubbles when a transition from group 2 to group 1 occurs. The levelization process performed by scheduler 230 and its components will be described in more detail below.

Controller 200 includes transmission unit 210. When scheduler 200 determines a time to send a read command or an empty cycle, it passes the command or the bubbles to transmission unit 210. Transmission unit 210 transmits them on the command bus.

Existing memory devices can support up to four timing domains. The present invention allows extending the range of timing domains ($t_{TR}$ range) beyond four. Two alternate embodiments are discussed below. Both embodiments use memory controller 200 to extend the $t_{TR}$ range. In the first embodiment, shown in FIG. 4A, four domains supported by the memory devices are combined into a first group and up to four additional domains are combined into a second group. In the second embodiment, shown in FIG. 4B, the first group includes the four domains supported by the memory devices, but each domain beyond the four domains in the first group is identified as a separate group.

Figure 4A:
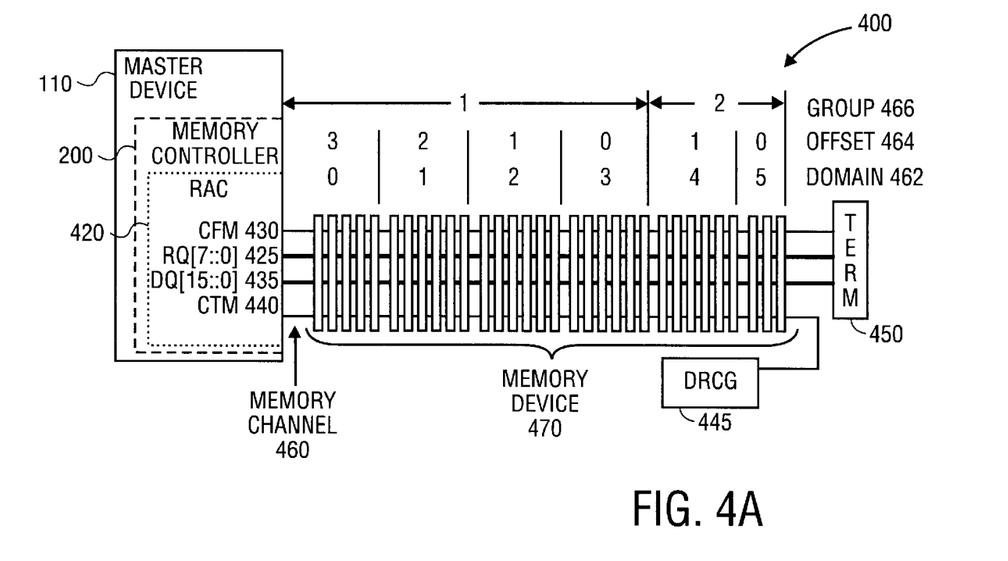
FIG. 4A is a block diagram for one embodiment of a memory system with extended tTR range.

FIG. 4A is a block diagram of one embodiment of a memory system with extended $t_{TR}$ range. Memory channel 460 is coupled to memory controller 200. In one embodiment, memory channel 460 is synchronous, i.e. all commands and data are referenced to clock edges. In one embodiment, commands and data are referenced at both clock edges of the clock cycle. Memories 470 are coupled to memory channel 460. In one embodiment, memories 470 are DRAMs. In alternate embodiments, memories 470 may be synchronous dynamic access memories (SDRAMs) or double data rate (DDR) synchronous DRAMs.

In one embodiment, the clock source may be a separate clock generator 445. The clock loop begins at the clock 445 end of channel 460 and propagates to the memory controller 200 through memory devices 470 as clock-to-master (CTM) 440. The clock signal returns back as clock-from-master (CFM) 430 from memory controller 200 through memory devices 470 and terminates at termination 450. For one embodiment, termination 450 is composed of termination resistors. At controller 200, CTM 440 and CFM 430 have the same phase and are not delayed with respect to each other.

Data transfers occur between controller 200 and memories 470 on data bus (DQ) 435. Commands are transferred from controller 200 to memories 470 on request bus (RQ) 425. Controller 200 includes an application specific integrated circuit (ASIC) controller (called a RAC) interface 420. Controller 200 uses a command scheduler (not shown) to define timing in controller 200 and determine the ordering of memory accesses.

CFM 430 is used to time commands and write data from controller 200 to memories 470. Commands may, for example, transfer addresses of the memory to be accessed, enable and disable RAM banks, set up read or write cycles, etc. Commands and data are sent synchronously with CFM 430. As the commands, data, and CFM 430 propagate along channel 460 from controller 200, they maintain their phase relationship. As a result, for data writes and command sequences, the distance of the controller 200 from memory 470 being addressed has no effect.

CTM 440 is used to time sending read data from memories 470 to controller 200. Each memory 470 returns data synchronously with CTM 440 to controller 200. The location of memory 470 defines the phase difference between CTM 440 and CFM 430. Channel 460 may be long enough to have a phase shift of several clock periods between CTM 440 and CFM 430.

A segment of the channel 460 that can be characterized by a half clock cycle of data flight time delay represents a timing domain. In addition, a timing domain may be defined as a segment of the channel 460 in which the phase difference between CTM 440 and CFM 430 is equal to a full clock cycle. The second definition applies to reading data from memories 470. When a read command is performed, there is a round-trip delay between sending the command and receiving read data at controller 200. As a result, the half clock cycle of data flight time is doubled and becomes a full clock cycle of delay.

In one embodiment, channel 460 may have five timing domains. In alternate embodiments, channel 460 may have six, seven, or eight timing domains. FIG. 4A illustrates an exemplary channel 460 having six timing domains, with domain 0 being nearest to controller 200 and domain 5 being farthest away from controller 200.

Each memory 470 can calculate the phase difference between CTM 440 and CFM 430 within the 360 degree phase window. However, memory 470 can not calculate how far from controller 200 it is placed, and how many clock periods are in the phase delay between CTM 440 and CFM 430. The distance from controller 200 and the difference in the phase delay between CTM and CFM become important when controller 200 issues a read command. The delay between the issue of a read command and the receipt at the memory controller 200 of the data returned from memory 470 depends on the distance of memory 470 from controller 200. Memory controller 200 needs to know when it can expect a response to a memory read command.

In one embodiment, a command scheduler included in RAC interface 420 combines memories located in domains 0 through 3 into a first group. The memories in the additional domains may be combined into a second group. In one embodiment shown in FIG. 4A, the second group may include two timing domains—domains 4 and 5. In alternate embodiments, the second group may include up to four timing domains. Levelization within each group is done by adding offset delays to output path delays of memory devices, as described below with reference to FIG. 3.

Figure 3:
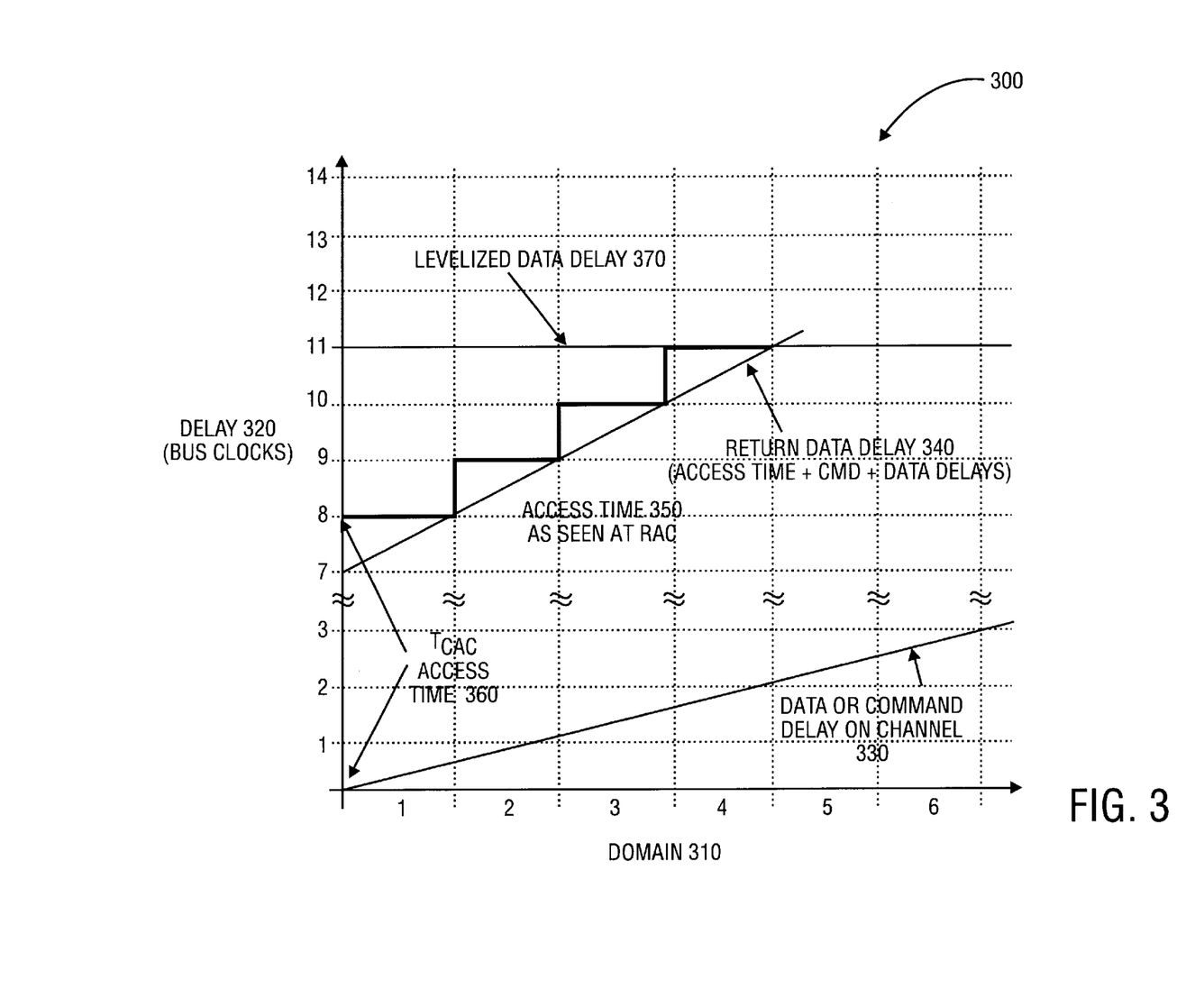
FIG. 3 illustrates one embodiment of an access time graph for a memory system.

FIG. 3 illustrates an access time graph for memory system 200 of one embodiment of the present invention. The relationship between timing domains 310 in a single group and delay time periods is demonstrated. When controller 200 sends a command or write data to memory 470, memory 470 receives the command after a delay. Delay 330 varies depending upon a timing domain 410 in which memory 470 is located. Data/command delay 330 shows the delay of getting commands or data to a memory 470, depending on the location of memory 470 relative to controller 200. In one embodiment, memories in timing domain 3 receive data with a delay of about two clocks. However, it will be recognized by one skilled in the art that delay time periods shown in FIG. 3 are merely exemplary and are provided for an illustrative purpose only.

The total time needed to return read data back to controller 200 includes $t_{CAC}$, the command delay time period 330, and the time period needed to get the requested read data back to controller 210. The constant $t_{CAC}$ defines the base access time 360—the time required to access a memory device that is located closest to controller 200. Return data delay 340 illustrates a relationship between timing domains 310 and a round trip delay of returned data. Access time 350 represents the number of bus clocks that RAC 420 sees between sending the read command to memory 470 and receiving the read data back from memory 470.

In one embodiment, memories located in a single timing domain have the same access time 350. Access time 350 has a shape of a stair step line because the command is sent on a CFM clock and the data is received on a CTM clock. Switching between the clocks forces an integral number of bus clocks between the command and returned data at memory controller interface 200. The difference between functions 340 and 350 represents the synchronization time used by memory 470 to transfer the read data from the CFM domain to the CTM domain.

The differences in the data access time for the various timing domains significantly complicate the task of controller 200 because controller 200 must track the response from each memory 470 and every timing domain 310. In addition, the timing differences reduce the pipeline throughput and prevent full interleaving across memories 470 on channel 460.

To avoid these problems, the timing on channel 460 is levelized. Levelization is a process that achieves equal read return timing for all memories 470 within a group, regardless of where memories 470 are located on channel 460. Levelized function 370 illustrates a levelized return data delay. The requested read data is returned to controller 200 from all memories 270 with a substantially similar delay. Levelization may be done by adding offset delays to output path delays of memory devices 470 closer to memory controller 200. Memories 470 may support an offset delay of up to three clock cycles added to their output path delays.

Each memory is programmed with a certain offset delay depending on the number of timing domains in the group and the timing domain in which the memory resides. Table 1 demonstrates the relationship between timing domains in the group, a domain in which the memory resides, and a corresponding offset delay.

TABLE 1

Domain Offsets Within a Group

| Domains within a group | Offset added to memories in | | | |
| --- | --- | --- | --- | --- |
| | Domain 0 | Domain 1 | Domain 2 | Domain 3 |
| 1 | 0 | n.a. | n.a. | n.a. |
| 2 | 1 | 0 | n.a. | n.a. |
| 3 | 2 | 1 | 0 | n.a. |
| 4 (or more) | 3 | 2 | 1 | 0 |

For example, group 1 shown in FIG. 4A includes four timing domains. Accordingly, in a group of such a size, memories in domain 0 have a delay of three bus cycles added to their output paths. Memories in domain 1 have a delay of two bus cycles added to their output paths. Memories in domain 2 have a delay of one bus cycle added to their output paths. Memories in domain 3 have the longest natural access time and have no delay added to their output paths. As a result, since all the memories in this group have the same access delay, the memory controller can treat accesses to any of them in the same way without needing to track the location of the memory within the group. The access delay for memories within group 1 is the access time to the memories in domain 0 ($t_{cac}$) plus three clocks.

Levelization within group 2 is done in a similar manner according to the number of timing domains included in group 2. Levelization between the two groups is done by the scheduler in the RAC interface 420. In one embodiment, the scheduler may be programmed to know which addresses correspond to which memories and whether a particular address falls into group 1 or 2.

When write commands and write data are sent to any memory in either group, no special control is required as write commands and write data are sent to all memories with the same timing. Receiving read data from memories in the first group also requires no special control because of the levelization offset programming supported by the memory devices. As described above, accesses to group 1 may be done with a total access delay of $t_{cac}$ plus 3 cycles. Receiving read data from the second group may require special control by the scheduler. In one embodiment, accesses to the second group may be done with a total access delay of $t_{cac}$ plus number of domains in the system minus one cycle, i.e. $t_{cac}$ plus 5 cycle.

The scheduler is configured to levelize between the two groups. In one embodiment, when a transition from group 2 to group 1 occurs with the corresponding different access times, the scheduler delays the issuance of the read command by entering two empty cycles to levelize the data return timing. As a result, read data returned from group 1 is interleaved transparently with read data returned from group 2. In addition, the scheduler may be configured to anticipate the receipt of two empty cycles ("bubbles") before receiving data from memories in group 2 when a transition occurs from accesses in group 1 to accesses in group 2.

In one embodiment, a cycle is a clock cycle. Alternatively, a cycle may be a command cycle. The command cycle may be more than one clock cycle long, e.g. in a Rambus system, a command cycle is four clocks long. As a result, when a delay of up to four clocks is required, the scheduler in the Rambus system needs to insert or anticipate only one empty command cycle. In a memory system using clock cycles, the scheduler needs to insert or anticipate four clock cycles to provide a delay of four clocks long. While using command cycles for levelization may simplify the control logic of the scheduler, more bubbles may be put into the bus when a command cycle is longer than the number of clocks required for a delay. For example, in a Rambus system, if the required delay is 3 clocks long, an extra clock cycle of bubbles is put into the bus when a command cycle is used to provide the delay.

Figure 5A:
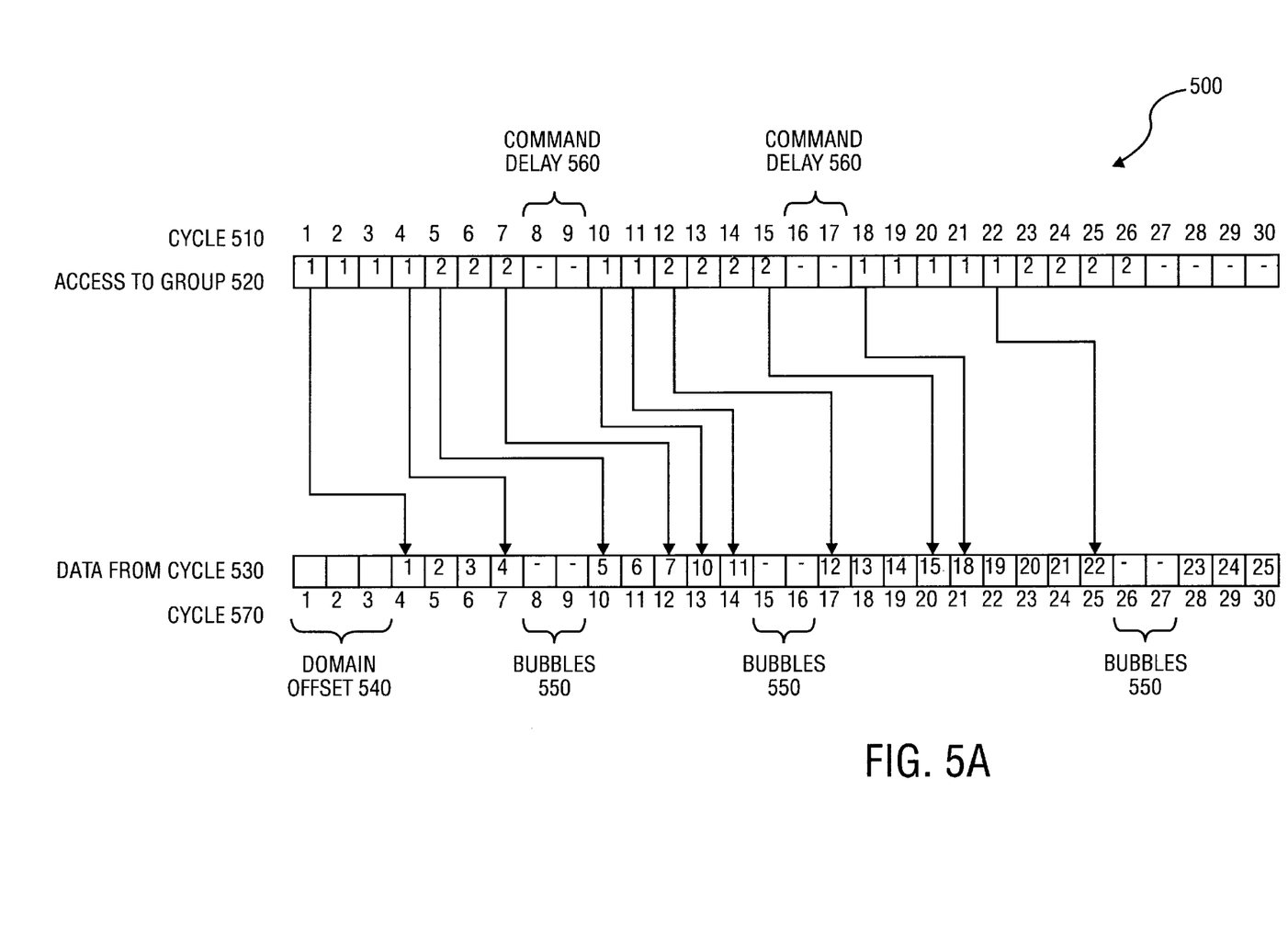
FIG. 5A illustrates access ordering between groups of one embodiment of the present invention.

FIG. 5A illustrates a timing diagram of one embodiment of access ordering between groups. Controller 200 issues commands to memories in groups 1 and 2. The commands are issued in cycles. FIG. 5A illustrates 30 cycles. For example, controller 200 may issue commands to memories in group 1 in cycles 1 through 4. As described above, accesses to memories in the first group 1 may be levelized and data may be received from the first group with a delay equal to $t_{cac}$ plus a domain offset 540. Because the base access time $t_{cac}$ has a constant value, FIG. 5A is simplified to show only domain offset 540.

Controller 200 receives read data from memories in both groups in cycles. In one embodiment, the domain offset 540 for read data from the first group may be three cycles. As a result, controller 200, in response to commands issued in cycles 1 through 4, may receive read data from the first group in cycles 4 through 7. Subsequent to sending commands to the first group, controller 200 may issue commands to memories in the second group in cycles 5 through 7. In one embodiment, the domain offset for the second group may be 5 cycles (i.e. total number of timing domains in both groups minus one cycle). Because the domain offset for the second group is longer than the domain offset for the first group, a read data return bubble 550 may occur when return data from the second cycle follows return data from the first cycle. In one embodiment, the domain offset for the first group may be 3 cycles and the domain offset for the second group may be 5 cycles (i.e. the total domain offset for both groups). Accordingly, controller 200 may receive two empty cycles or two cycles of bubbles 550 in cycles 8 and 9 before receiving data from the second group. In one embodiment, the scheduler is configured to anticipate two cycles of bubbles 550 when a transition occurs from requests to the first group to requests to the second group. Controller 200 may receive data from the second group in cycles 10 through 12.

When read commands to memories in the first group follow read commands to the second group, the scheduler delays the commands to the first group to avoid overwriting the data returned from the second group with the data from the first group. In one embodiment, the scheduler may delay read commands to the first group by two cycles when the group access changes from the second group to the first group. As shown in FIG. 5A, the command delay 560 of two cycles may occur in cycles 8 and 9 before the scheduler issues commands to the first group in cycles 10 and 11.

In one embodiment, the command delay 560 may create timing bubbles in the command bus. The bubbles may have an impact on the peak transfer bandwidth if accesses to memories in the system are poorly ordered. Clustering the group accesses allows keeping the pipeline nature of the memory channel intact. In addition, in one embodiment, the empty cycles on the command bus created by the command delay 560 may be filled with memory control commands. The memory control commands may include, for example, bank open commands, bank close commands, power state management commands, or other commands. Alternatively, the dead times on the command bus may be used for write data commands if the data bus is also available for data transfers. Furthermore, in one embodiment, levelization between the two groups does not complicate the control logic in the scheduler because of a small number of timing options required for the levelization. Accordingly, extending the $t_{TR}$ range via the memory controller has essentially no impact on pipelining, speed and efficiency of the memory system.

Figure 4B:
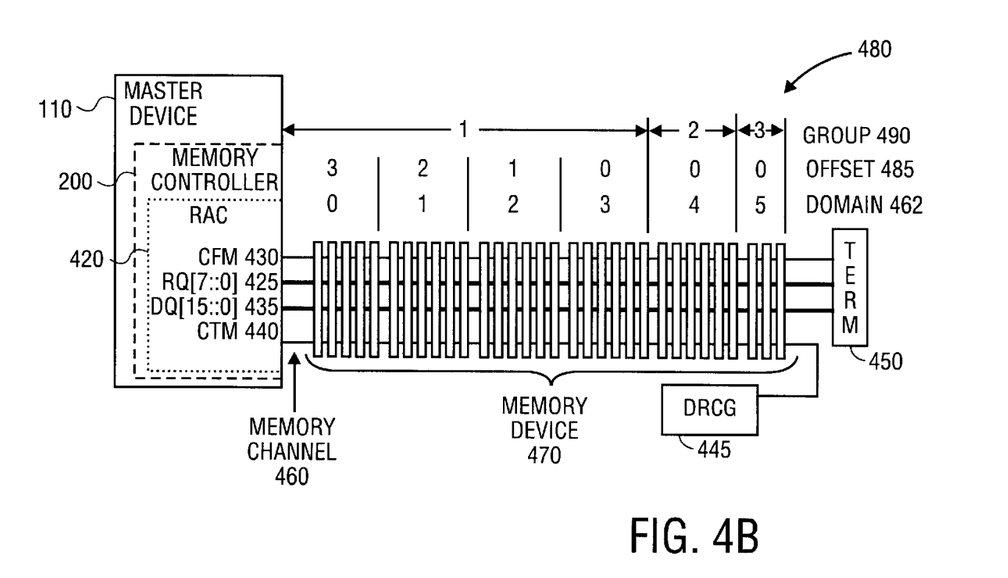
FIG. 4B is a block diagram for another embodiment of a memory system with extended tTR range.

FIG. 4B is a block diagram of another embodiment for a memory system with extended $t_{TR}$ range. Memory channel 460 is coupled to memory controller 200. Controller 200 includes RAC interface 420. Memory devices 470 are coupled to channel 460 and controller 200. In one embodiment, channel 460 may be represented by six timing domains 462. In this embodiment, a command scheduler included in RAC interface 320 may combine memories into groups 490. Memories located in domains 0 through 3 may be combined into a first group. The memories in each additional domain may be combined into a separate group. In one embodiment shown in FIG. 4b, memories in timing domain 4 are combined into a second group and memories in timing domain 5 are combined into a third group. In alternate embodiments, the memory system 480 may have more than three groups, with each additional timing domain being an extra group.

The levelization offset programming 485 for the first group may be done as described above with reference to FIG. 3. In one embodiment, no levelization within the second and third groups is needed because each of these groups includes only memories in one domain. In one embodiment, the scheduler in the RAC interface 420 may be programmed to determine which addresses correspond to which memories and whether a particular address falls into group 1, 2 or 3.

In one embodiment, when write commands and write data are sent to any memory in any group, no special control is required as write commands and write data are sent to all memories with the same timing. Receiving read data from memories in the first group also requires no special control because of the levelization offset programming described above. As described above, accesses to group 1 have a total access delay of $t_{cac}$ plus 3 clocks. Receiving read data from the second and third groups may require special control by the scheduler. In one embodiment, accesses to the second group have a total access delay equal to $t_{cac}$ plus the number of domains in the first and second groups minus one cycle, i.e. $t_{cac}$ plus 4 cycles. Accesses to the third group have a total access delay equal to $t_{cac}$ plus the number of domains in the first, second and third groups minus one cycle, i.e. $t_{cac}$ plus 5 cycles. The scheduler is configured to levelize between the three groups.

In one embodiment, when a transition occurs from group 3 to group 2, from group 2 to group 1, or from group 3 to group 1, the scheduler delays the issuance of the read command to levelize the data return timing. In one embodiment, the scheduler delays the read commands by one cycle for transitions from group 3 to group 2 and from group 2 to group 1. The scheduler delays the read command by two cycles for transitions from group 3 to group 1.

As a result, read data returned from groups 2 and 3 is interleaved transparently with read data returned from group 1. In addition, the scheduler may be configured to anticipate receiving bubbles when a transition occurs from accesses in group 1 to accesses in group 2, from accesses in group 2 to accesses in group 3, or from accesses in group 1 to accesses in group 3. In one embodiment, the scheduler anticipates one cycle of bubbles for transitions from group 1 to group 2 and from group 2 to group 3. The scheduler anticipates two cycles of bubbles when transition occurs from accesses in group 1 to accesses in group 3.

Figure 5B:
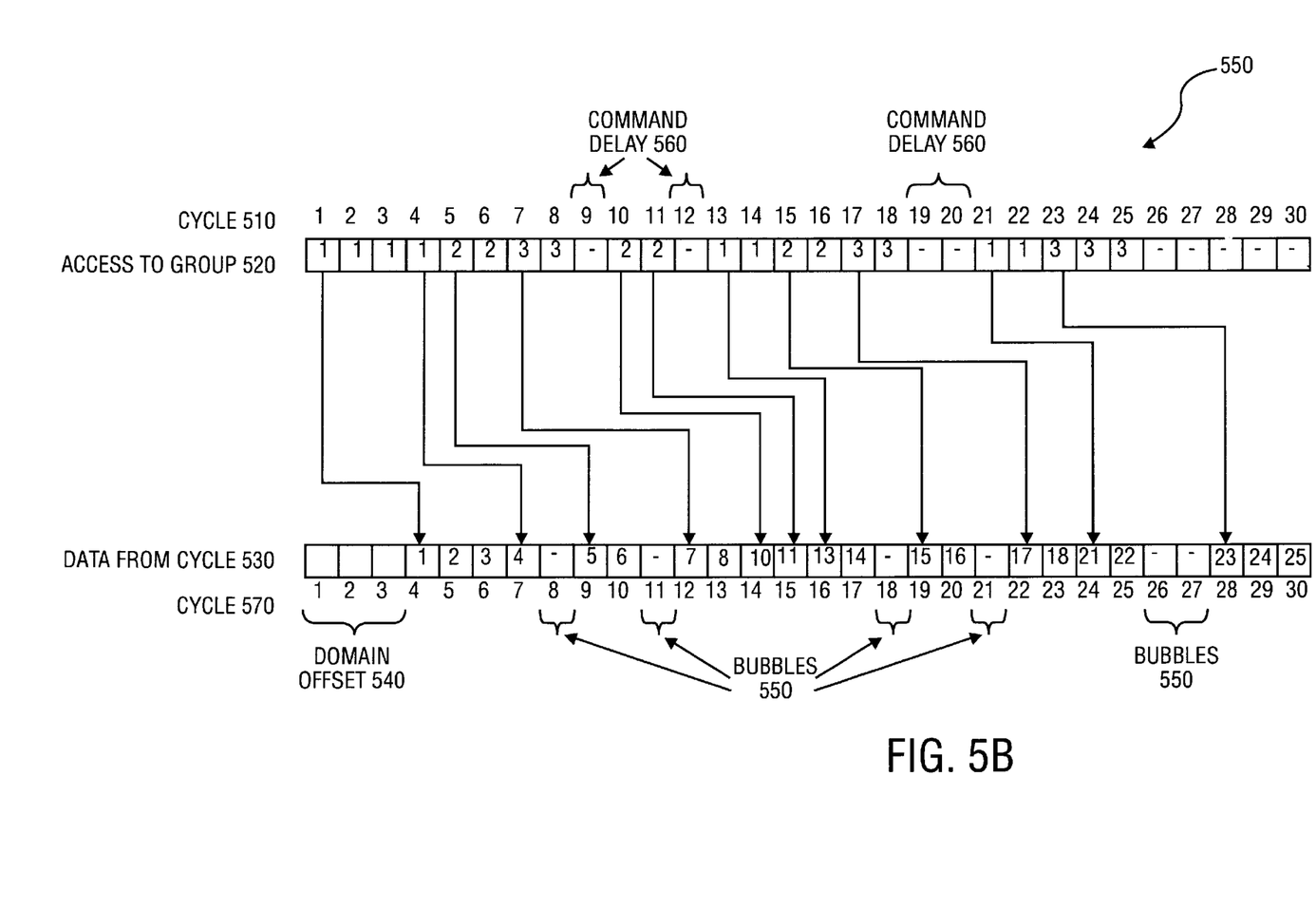
FIG. 5B illustrates a timing diagram of one embodiment of access ordering.

FIG. 5B illustrates a timing diagram of another embodiment of access ordering between the groups. Controller 200 issues commands to memories in groups 1, 2 and 3. The commands are issued in cycles 510. For example, controller 200 may issue commands to memories in the first group in cycles 1 through 4. As described above, accesses to memories in the first group may be levelized and data may be received from the first group with a delay equal to $t_{cac}$ plus a domain offset 540. Because the base access time $t_{cac}$ has a predefined constant value, FIG. 5B is simplified to show only domain offset 540.

Controller 200 receives read data from memories in all three groups in cycles 570. In one embodiment, the domain offset for read data from the first group is three cycles. As a result, controller 200, in response to commands issued in cycles 1 through 4, may receive read data from the first group in cycles 4 through 7. Subsequent to commands to the first group, controller 200 may issue commands to memories in the second group in cycles 5 and 6. In one embodiment, the domain offset for the second group may be 4 cycles (i.e. total number of timing domains in the first and second groups minus one cycle). Because the domain offset for the second group is one cycle longer than the domain offset for the first group, a read data return bubble may occur when read data from the second group follows the data from the first group.

In one embodiment, the scheduler is configured to anticipate a cycle of bubbles 550 when a transition occurs from accesses in the first group to accesses in the second group.

Controller 200 may issue read commands to memories in the third group in cycles 7 and 8. In one embodiment, the domain offset for the third group may be 5 cycles (i.e. total number of timing domains in the first, second, and third groups, minus one cycle). Because the domain offset for the third group is one cycle longer than the domain offset for the second group, a read data return bubble may occur when read data from the second cycle follows the data received from the first cycle. Controller 200 may receive data from the third group in cycles 12 and 13. In one embodiment, the scheduler is configured to anticipate a cycle of bubbles 550 when a transition occurs from accesses in the second group to accesses in the third group.

When read commands to memories in the second group (cycles 10 and 11) follow read commands to the third group (cycles 7 and 8), the scheduler may delay the commands to the second group to avoid overwriting the data returned from the third group with the data from the second group. In one embodiment, the scheduler may delay read commands to the second group by one cycle when the group access changes from the third group to the second group. Similarly, when read commands to memories in the first group follow read commands to the second group, the scheduler may delay the commands to the first group to avoid overwriting the data returned from the second group with the data from the first group. In one embodiment, the scheduler may delay read commands to the first group by one cycle when the group access changes from the second group to the first group.

In one embodiment, controller 200 issues read commands to group 1 (cycles 21 and 22) following the read commands to group 3 (cycles 17 and 18). In this embodiment, the scheduler may delay the commands to group 1 to avoid overwriting the data returned from the third group with the data from the first group. In one embodiment, the scheduler may delay read commands to the first group by two cycles when the group access changes from the third group to the first group.

In one embodiment, controller 200 issues read commands to group 3 (cycles 23–25) following the read commands to group 1 (cycles 21 and 22). As described above, the domain offset for the third group is 5 cycles and the domain offset for the first group is 3 cycles. Because the domain offset for the third group is two cycles longer than the domain offset for the first group, two cycles of return bubbles may occur when read data from the third group follows the read data from the first group. In one embodiment, the scheduler is configured to anticipate two cycles of bubbles 550 when a transition occurs from accesses in the first group to accesses in the third group.

Creating a separate group for memories in each timing domain may require more timing options, as compared to timing options in the memory system with only two groups of timing domains. While creating only two groups may simplify the control logic in the scheduler, fewer bubbles may be put into the bus when each additional group contains memories in only one timing domain.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for extending a $t_{TR}$ range of memory devices coupled to a memory channel comprising:

identifying at least a first group of memory devices and a second group of memory devices, the first group including memory devices located close to a memory controller and the second group including memory devices located a distance away from the memory controller;

sending commands to access memory devices in the first and second groups, such that a command to the first group is sent with a transitional delay when the command to the first group follows a command to the second group; and receiving data from the first and second groups.

2. The method of claim 1 wherein the memory channel is represented by multiple timing domains numbered consecutively with a first timing domain being a shortest distance from the memory controller and a last timing domain being a longest distance from the memory controller.

3. The method of claim 2 wherein the first group includes memory devices located in first four timing domains and the second group includes memory devices located in a fifth timing domain.

4. The method of claim 3 wherein a transitional delay is defined based upon a number of timing domains included in the second group.

5. The method of claim 2 wherein the second group includes memory devices located in fifth and sixth timing domains.

6. The method of claim 1 further comprising identifying a third group of memory devices, the third group following the second group and being a longer distance from the memory controller than the second group.

7. The method of claim 6 further comprising:

sending a command to access memory devices in the third group, such that the command to the first group is sent with a second transitional delay when the command to the first group follows the command to the third group; and receiving data from the third group.

8. The method of claim 7 wherein a second transitional delay is defined based upon a total number of timing domains included in the second and third groups.

9. A method for extending a $t_{TR}$ range of memory devices coupled to a memory channel comprising:

identifying at least a first group of memory devices and a second group of memory devices, the first group including memory devices located close to a memory controller and the second group including memory devices located a distance away from the memory controller;

sending commands to access memory devices in the first and second groups; and receiving data from the memory devices in response to the commands, such that data from the second group is received with a transitional delay when the data from the second group follows the data from the first group.

10. The method of claim 9 wherein the memory channel is represented by multiple timing domains numbered consecutively with a first timing domain being a shortest distance from the memory controller and a last timing domain being a longest distance from the memory controller.

11. The method of claim 10 wherein the first group includes memory devices located in first four timing domains and the second group includes memory devices located in a fifth timing domain.

12. The method of claim 11 wherein a transitional delay is defined based upon a number of timing domains included in the second group.

13. The method of claim 10 wherein the second group includes memory devices located in fifth and sixth timing domains.

14. The method of claim 9 further comprising identifying a third group of memory devices, the third group following the second group and being a longer distance from the memory controller than the second group.

15. The method of claim 14 further comprising:

sending a command to access memory devices in the third group; and receiving data from the third group in response to the command, such that the data from the third group is received with a second transitional delay when the data from the third group follows the data from the second group.

16. The method of claim 15 wherein a second transitional delay is defined based upon a total number of timing domains included in the second and third groups.

17. A scheduler comprising:

a grouping unit for identifying at least a first group of memory devices and a second group of memory devices, the first group including memory devices located close to a memory controller and the second group including memory devices located a distance away from the memory controller; and a command delay and read data anticipation function for sending commands to access memory devices in the first and second groups, and receiving data from the memory devices in response to the commands, such that data from the second group is received with a transitional delay when the data from the second group follows the data from the first group.

18. The scheduler of claim 17 wherein the memory channel is represented by multiple timing domains numbered consecutively with a first timing domain being a shortest distance from the memory controller and a last timing domain being a longest distance from the memory controller.

19. The scheduler of claim 18 wherein the first group includes memory devices located in first four timing domains and the second group includes memory devices located in a fifth timing domain.

20. The scheduler of claim 19 wherein the transitional delay is based upon a number of timing domains included in the second group.

21. The scheduler of claim 18 wherein the second group includes memory devices located in fifth and sixth timing domains.

22. The scheduler of claim 17 wherein the grouping unit is further configured to identify a third group of memory devices, the third group following the second group and being a longer distance from the memory controller than the second group.

23. The scheduler of claim 22 wherein the command delay and read data anticipation function is further configured to send a command to access memory devices in the third group, and receive data from the third group in response to the command such that the data from the third group is received with a second transitional delay when the data from the third group follows the data from the second group.

24. The scheduler of claim 23 wherein the second transitional delay is based upon a total number of timing domains included in the second and third groups.

25. A scheduler comprising:

a grouping unit for identifying at least a first group of memory devices and a second group of memory devices, the first group including memory devices located close to a memory controller and the second group including memory devices located a distance away from the memory controller; and a command delay and read data anticipation function for sending commands to access memory devices in the first and second groups such that a command to the first group is sent with a transitional delay when the command to the first group follows a command to the second group, and receiving data from the first and second groups.

26. The scheduler of claim 25 wherein the memory channel is represented by multiple timing domains numbered consecutively with a first timing domain being a shortest distance from the memory controller and a last timing domain being a longest distance from the memory controller.

27. The scheduler of claim 26 wherein the first group includes memory devices located in first four timing domains and the second group includes memory devices located in a fifth timing domain.

28. The scheduler of claim 27 further comprising a command delay insertion unit for defining the transitional delay based upon a number of timing domains included in the second group.

29. The scheduler of claim 26 wherein the second group includes memory devices located in fifth and sixth timing domains.

30. The scheduler of claim 25 wherein the grouping unit is further configured to identify a third group of memory devices, the third group following the second group and being a longer distance from the memory controller than the second group.

31. The scheduler of claim 30 wherein the command delay and read data anticipation function is further configured to send a command to access memory devices in the third group such that the command to the first group is sent with a second transitional delay when the command to the first group follows the command to the third group, and receive data from the third group.

32. The system of claim 31 further comprising a command delay insertion unit for defining the second transitional delay based upon a total number of timing domains included in the second and third groups.

33. A system comprising:

a memory controller;

a memory channel coupled to the memory controller; and multiple groups of memory devices coupled to the memory channel and located at various distances from the memory controller, the memory controller defining one or more transitional delays for transitions between the multiple groups and sending commands to access memory devices in the multiple groups using the one or more transitional delays.

34. The system of claim 33 wherein the memory channel is represented by multiple timing domains numbered consecutively with a first timing domain being a shortest distance from the memory controller and a last timing domain being a longest distance from the memory controller.

35. The system of claim 34 wherein a first of the multiple groups includes memory devices located in first four timing domains and a second of the multiple groups includes memory devices located in a fifth timing domain.

36. The system of claim 35 wherein a transitional delay for a transition between the first group and the second group is defined based upon a number of timing domains included in the second group.

* * * * *